United States Patent [19]
Long

[11] Patent Number: 5,448,277
[45] Date of Patent: Sep. 5, 1995

[54] VIRTUAL PROCESS CONTROLS TEST PATTERN FOR ELECTRONIC PRINTERS

[75] Inventor: Harry W. Long, Pittsford, N.Y.

[73] Assignee: Xerox Corporation, Stamford, Conn.

[21] Appl. No.: 83,585

[22] Filed: Jun. 30, 1993

[51] Int. Cl.⁶ .......................................... B41J 2/435
[52] U.S. Cl. ................................ 347/129; 355/218; 382/276; 395/100
[58] Field of Search ............... 355/218, 246, 208; 358/406, 461, 456, 535; 346/76 PH, 160, 107; 347/129, 131, 183, 251; 395/100, 105–109, 117; 382/41, 42, 48, 10, 23, 58, 61

[56] References Cited

U.S. PATENT DOCUMENTS

| | | | |
|---|---|---|---|
| 4,525,748 | 6/1985 | Carbone | 358/456 |
| 4,596,993 | 6/1986 | Erlichman | 346/76 PH |
| 4,812,918 | 3/1989 | Carbone | 358/455 |
| 4,957,367 | 9/1990 | Dulman | 356/359 |
| 5,019,859 | 5/1991 | Nash . | |
| 5,048,094 | 9/1991 | Aoyama et al. | 382/8 |
| 5,208,871 | 5/1993 | Eschbach | 382/41 |
| 5,237,646 | 8/1993 | Bunce | 395/117 |
| 5,282,053 | 1/1994 | Robideau | 358/406 |
| 5,300,961 | 4/1994 | Corona et al. | 346/160 |
| 5,323,245 | 6/1994 | Rylander | 358/536 |
| 5,359,671 | 10/1994 | Rao | 382/15 |

*Primary Examiner*—A. T. Grimley
*Assistant Examiner*—T. A. Dang
*Attorney, Agent, or Firm*—Oliff & Berridge

[57] ABSTRACT

In a method and apparatus for testing subsystem and/or system performance of an electronic printer, a controller uses an electronic scanning system bitmap representing an image to be printed to determine locations to be sensed by a plurality of sensors. The sensors are strategically located throughout the printing apparatus and are adapted to sense particular attributes in the designated image areas during the imaging process. The sensed image characteristics are compared with predetermined model characteristics, and the outputs are adjusted in accordance with the comparison to the model characteristics. In addition to the control function just described, the controller uses the information about the image contained in the image bitmap to determine the location and timing for the sensors, thereby enabling pre- and post-transfer testing without the printing of test pages or test patches.

24 Claims, 6 Drawing Sheets

VIRTUAL PROCESS CONTROLS TEST PATTERN FOR ELECTRONIC PRINTERS

BACKGROUND OF THE INVENTION

The present invention relates to a method and apparatus for testing subsystem and/or system performance of an electronic printer, and more particularly, to a method and apparatus for testing subsystem and/or system performance of an electronic color printer using selected portions of an electronic scanning system (ESS) bitmap representing an image to be printed as a virtual test pattern.

Conventional imaging process control systems often generate separate images or patches to be read by various sensors, such as an electrostatic voltmeter (ESV), an infrared densitometer (IRD), toner area coverage sensor (TAC), densitometer, colorimeter, etc. Each of the sensors is adapted to sense attributes of the image throughout the imaging process. The sensor output is used for the purpose of characterizing subsystem performance as part of a closed loop control system.

In an office environment, sensing is typically limited to subsystems prior to the transfer step; the resulting untransferred images can impose unwanted stresses on the cleaning system. This is because post-transfer sensing requires the printing of control images or test patches on the output prints or on special test prints. Clearly, an operator would object to such images or patches on their output.

Frequently, the marking engine of an electronic reprographic printing system is an electrophotographic printing machine. In an electrophotographic printing machine, a photoconductive member is charged to a substantially uniform potential to sensitize the surface thereof. The charged portion of the photoconductive member is exposed. Exposure of the charged photoconductive member selectively dissipates the charge thereon in the irradiated areas. This records an electrostatic latent image on the photoconductive member corresponding to the informational areas contained within the original document being reproduced. After the electrostatic latent image is recorded on the photoconductive member, the latent image is developed by bringing toner into contact therewith. This forms a developed toner image on the photoconductive member, which is subsequently transferred to a copy sheet. The copy sheet is heated to permanently affix the toner image thereto in image configuration.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complimentary thereto. This process is repeated a plurality of cycles for differently colored images and their respective complimentarily colored toner. In some applications each single color toner image is transferred to an intermediate member or to the copy sheet in superimposed registration with the prior toner image. In other applications all four separations may be transferred simultaneously to the final copy sheet. This creates a multi-layered toner image on the copy sheet. Thereafter, the multi-layered toner image is permanently affixed to the copy sheet creating a color copy. The developer material may be a liquid material or a powder material.

U.S. Pat. No. 5,019,859 granted to Thomas W. Nash on May 28, 1991 relates to a highlight color imaging apparatus and method for creating highlight color images that allows the inter-image areas to be used for developability or other control functions notwithstanding the necessity of developer switching. The black and highlight color images are separately formed and the order of image formation is one where the black image (B1) for the first copy is formed, followed by the highlight color image (C1) for the first copy; then the highlight color image (C2) for the second copy; then the black image (B2) for the second copy; then the black image (B3) for the third copy and finally the highlight color image (C3) for the third copy. With the foregoing order of image creation, developer switching is not required when two adjacent images are the same color. When developer switching is not required, the inter-image area can be used for process control such as developability to form a test pattern. Thus, in the example above, the area between the two adjacent color images (C1,C2) is available for forming a color test patch. Likewise, the area between the two black images (B2,B3), is available for forming a black test patch.

SUMMARY OF THE INVENTION

It is an object of the present invention to overcome the problems in the conventional apparatus.

It is a further object of the present invention to provide a method and apparatus for testing subsystem performance of an electronic printer using an ESS bitmap representing an image to be printed. The system searches the ESS bitmap to preselect points in the image according to predetermined criteria to be sensed for use by the process controls sensors. The method and apparatus can sense pre-transfer or post-transfer characteristics of the image in accordance with a plurality of strategically located and/or movable sensors without the creation of unwanted test copies or images.

To achieve the foregoing and other objects, a method and apparatus for testing subsystem performance of an electronic printer using an electronic scanning system bitmap representing an image to be printed is provided. The method includes the steps of determining a location in the bitmap of at least one point in the image for sensing, wherein the location is determined based on predetermined criteria; sensing a characteristic of the at least one point in the image in accordance with a type of sensing apparatus; comparing the characteristic with a target characteristic; and adjusting the characteristic to correspond with the target characteristic in accordance with the comparing step.

In another aspect of the invention, the determining step includes the step of determining a sample selection filter in accordance with a sampling strategy. The step of determining the sampling strategy includes the steps of determining sample selection criteria in accordance with the predetermined criteria and providing a sampling plan describing sample frequency signal processing and data reduction, and/or limit criteria.

In yet another aspect of the invention, the method includes, prior to the location determining step, the step of screening the bitmap in accordance with the sample selection filter to determine whether suitable areas for sensing exist, and, wherein if no suitable areas for sensing exist, the step of reverting to a default strategy.

In still another aspect of the present invention, the method includes the steps of calculating the target characteristics and locating coordinates of the suitable areas in the bitmap. The target characteristic calculating step includes the steps of setting a target input/output relationship and adjusting the relationship in accordance with a previous input/output history.

In a further aspect of the invention, the method also includes the step of adjusting the target characteristics for positional effects and further adjusting the target characteristics during run time in accordance with control system time constants.

The system calculates a timing diagram for the sensing apparatus to perform the sensing step in accordance with the locating step.

In still another aspect of the invention, the sensing apparatus is movable, and the method further includes the step of moving the sensing apparatus and making attendant adjustments to the timing diagram.

An apparatus is similarly provided for carrying out the above-described method. In addition, the sensing device includes at least one of an electrostatic voltmeter (ESV), an infra-red densitometer (IRD), a densitometer, a colorimeter, a spectrophotometer, and a toner area coverage (TAC) sensor.

BRIEF DESCRIPTION OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

While the present invention will hereinafter be described in connection with a preferred apparatus and method of use, it will be understood that it is not intended to limit the invention to that apparatus or method of use. On the contrary, it is intended to cover all alternatives, modifications and equivalents as may be included within the spirit and scope of the invention as defined by the appended claims.

Figure 1:
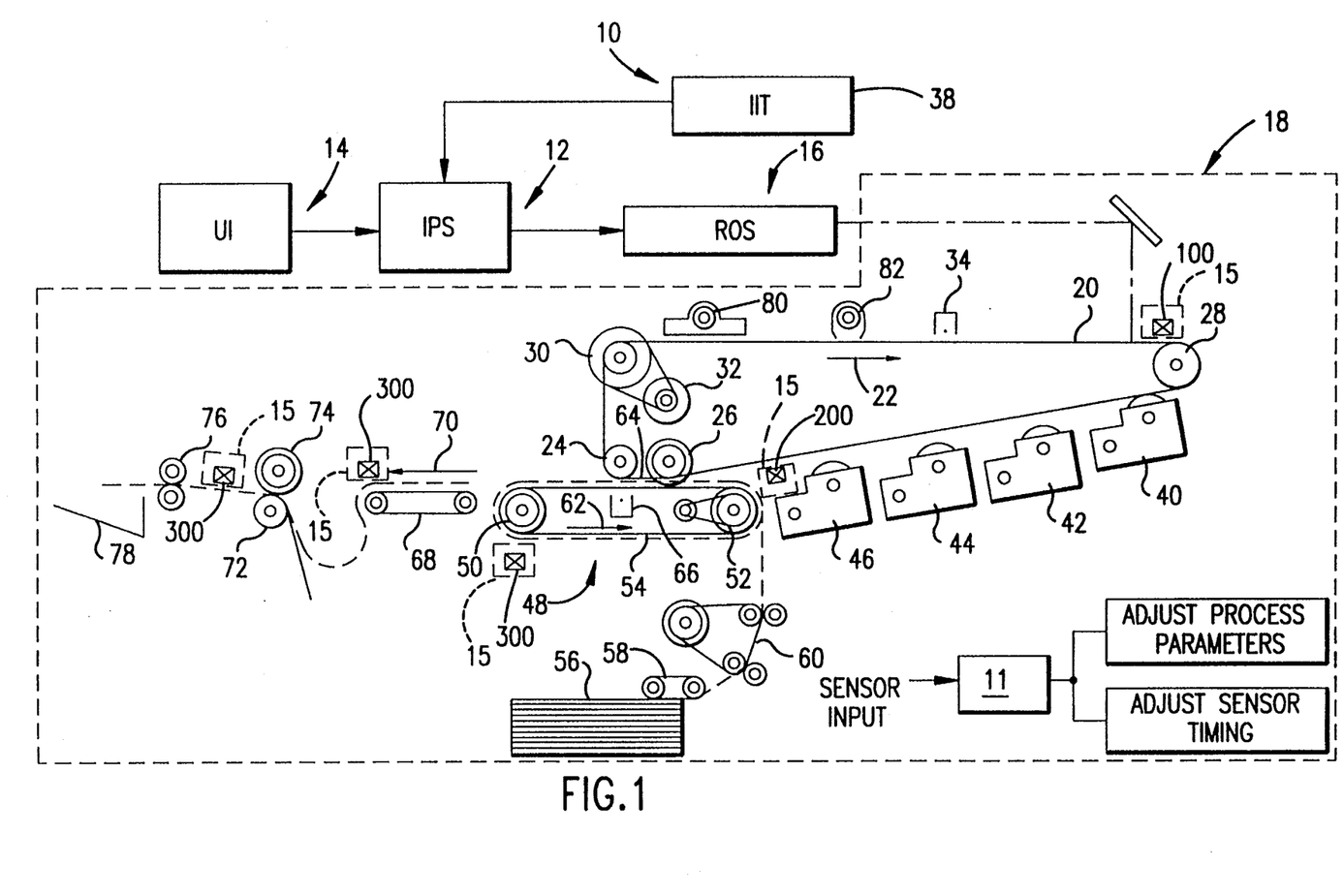
FIG. 1 is a schematic elevational view illustrating an electronic reprographic printing system incorporating the features of the present invention therein.

For a general understanding of the features of the present invention, reference is made to the drawings. In the drawings, like reference numerals have been used throughout to designate identical elements. FIG. 1 is a schematic elevational view of an illustrative electronic reprographic system incorporating the features of the present invention therein. It will become evident from the following discussion that the present invention is equally well suited for use in a wide variety of printing systems, and is not necessarily limited in its application to the particular system shown herein.

Turning initially to FIG. 1, during operation of the printing system, a multi-color original document 38 is positioned on an image input terminal (IIT) such as a raster input scanner or a computer, indicated generally by the reference numeral 10. The IIT contains document illumination lamps, optics, a mechanical scanning drive, and a charge coupled device (CCD array). In the case of a raster input scanner (RIS) as the IIT, the IIT captures the entire original document and converts it to a series of raster scan lines and measures a set of primary color densities, i.e., red, green and blue densities, at each point of the original document. In the case of a computer as the IIT, the image is raster encoded in a bitmap by the computer. This information is transmitted to an image processing system (IPS), indicated generally by the reference numeral 12. IPS 12 is the control electronics that prepare and manage the image data flow to the raster output scanner (ROS), indicated generally by the reference numeral 16. A user interface (UI), indicated generally by the reference numeral 14, is in communication with the IPS. The UI enables the operator to control the various operator adjustable functions. The output signal from the UI is transmitted to IPS 12. The signal corresponding to the desired image is transmitted from IPS 12 to ROS 16, which creates the output light image. ROS 16 lays out the image in a series of horizontal scan lines with each line having a specified number of pixels per inch. The ROS includes a laser having a rotating polygon mirror block associated therewith. The ROS exposes the charged photo-conductive surface of the printer, indicated generally by the reference numeral 18, to achieve a set of subtractive primary latent images. The latent images are developed with cyan, magenta, and yellow, and black developer material, respectively. These developed images are transferred to a copy sheet in superimposed registration with one another to form a multi-colored image on the copy sheet. This multi-colored image is then fused to the copy sheet forming a color copy.

With continued reference to FIG. 1, printer or marking engine 18 is an electrophotographic printing machine. The electrophotographic printing machine employs a photoconductive belt 20. Belt 20 moves in the direction of arrow 22 to advance successive portions of the photo-conductive surface sequentially through the various processing stations disposed about the path of movement thereof. Belt 20 is entrained about transfer rollers 24 and 26, tensioning roller 28, and drive roller 30. Driver roller 30 is rotated by a motor 32 coupled thereto by suitable means such as a belt drive. As roller 30 rotates, it advances belt 20 in the direction of arrow 22.

Initially, a portion of photoconductive belt 20 passes through the charging station. At the charging station, a corona generating device, indicated generally by the reference numeral 34 charges photoconductive belt 20 to a relatively high, substantially uniform potential.

Next, the charged photoconductive surface is rotated to the exposure station. The exposure station includes the IIT 10 having a multi-colored original document 38 positioned or represented therein. The IIT, for example, an RIS, captures the entire image from the original document 38 and converts it to a series of raster scan lines which are transmitted as electrical signals to IPS 12. The electrical signals from the IIT correspond to the red, green, blue, and black densities at each point in the document. The IPS converts the set of red, green, blue, and black density signals, i.e., the set of signals corresponding to the primary color densities of original document 38, to a set of colorimetric coordinates. The operator actuates the appropriate keys of the UI 14 to adjust the parameters of the copy. UI 14 may be a touch screen or any other suitable control panel, providing an operator interface with the system. The output signals from the UI are transmitted to the IPS. The IPS then transmits signals corresponding to the desired image to ROS 16. ROS 16 includes a laser with rotating polygon mirror blocks. Preferably, a nine facet polygon is used. The ROS illuminates the charged portion of photoconductive belt 20 at a rate of about 400 pixels per inch. The ROS will expose the photoconductive belt to record four latent images. One latent image is adapted to be developed with cyan developer material; another latent image is adapted to be developed with magenta developer material; the third latent image is developed with yellow developer material; and the fourth latent image is developed with black developer material. The latent images formed by the ROS on the photoconductive belt 20 correspond to the signals from IPS 12.

After the electrostatic latent image has been recorded on photoconductive belt 20, belt 20 advances the electrostatic latent image to the development station. The development station includes four individual developer units generally indicated by the reference numerals 40, 42, 44 and 46. The developer units are of a type generally referred to in the art as "magnetic brush development units." Typically, a magnetic brush development system employs a magnetic developer material including magnetic granules having toner particles adhering triboelectrically thereto. The developer material is continually brought through a directional flux field to form a brush of developer material. The developer particles are continually moving so as to provide the brush consistently with fresh developer material. Development is achieved by bringing the brush of developer material into contact with the photoconductive surface. Developer units 40, 42 and 44, respectively, apply toner particles of a specific color that corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 10, while the green area will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles.

Developer unit 46 contains black toner particles and may be used to develop the electrostatic latent image formed from a black and white original document. Each of the developer units is moved into and out of the operative position. In the operative position, the magnetic brush is closely adjacent the photoconductive belt, while, in the non-operative position, the magnetic brush is spaced therefrom. During development of each electrostatic latent image, only one developer unit is in the operative position, the remaining developer units are in the non-operative position. This ensures that each electrostatic latent image is developed with toner particles of the appropriate color with co-mingling. In FIG. 1, developer unit 40 is shown in the operative position with developer units 42, 44 and 46 being in the non-operative position.

After development, the toner image is moved to the transfer station where the toner image is transferred to a sheet of support material, such as plain paper amongst others. At the transfer station, the sheet transport apparatus, indicated generally by the reference numeral 48, moves the sheet into contact with photoconductive belt 20. Sheet transport 48 has a pair of spaced belts 54 entrained about rolls 50 and 52. A gripper extends between belts 54 and moves in unison therewith. The sheet is advanced from a stack of sheets 56 disposed on a tray. A friction retard feeder 58 advances the uppermost sheet from stack 56 onto a pre-transfer transport 60. Transport 60 advances the sheet to sheet transport 48. The sheet is advanced by transport 60 in synchronism with the movement of the gripper. In this way, the leading edge of the sheet arrives at a preselected position, i.e., a loading zone, to be received by the open gripper. The gripper then closes, securing the sheet thereto for movement therewith in a recirculating path. The leading edge of the sheet is secured releasably by the gripper.

As the belts move in the direction of arrow 62, the sheet moves into contact with the photoconductive belt in synchronism with the toner image developed thereon. At transfer zone 64, a corona generating device 66 sprays ions onto the backside of the sheet so as to charge the sheet to the proper magnitude and polarity for attracting the toner image from photoconductive belt 20 thereto. The sheet remains secured to the gripper so as to move in a recirculating path for three cycles. In this way, three different color toner images are transferred to the sheet in superimposed registration with one another. One skilled in the art will appreciate that the sheet may move in a recirculating path for four cycles when under color black removal is used and up to eight cycles when the information on two original documents is being merged onto a single copy sheet. Each of the electrostatic latent images recorded on the photoconductive surface is developed with the appropriately colored toner, which are transferred, in superimposed registration with one another, to the sheet to form the multi-color copy of the colored original document.

After the last transfer operation, the grippers open and release the sheet. Conveyor 68 transports the sheet, in the direction of arrow 70, to the fusing station where the transferred image is permanently fused to the sheet. The fusing station includes a heated fuser roll 74 and a pressure roll 72. The sheet 52 passes through the nip defined by fuser roll 74 and pressure roll 72. The toner image contacts fuser roll 74 so as to be affixed to the sheet. Thereafter, the sheet is advanced by forwarding roll pairs 76 to catch tray 78 for subsequent removal therefrom by the machine operator.

The last processing station in the direction of movement of belt 20, as indicated by arrow 22, is the cleaning station. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

The system includes a plurality of sensors for sensing characteristics of the image. These characteristics include, for example, toner area coverage, image density, photoreceptor voltage color balance, and dot gain. An electrostatic voltmeter (ESV) 100 senses certain electrostatic charge levels on photoconductive belt 20 prior to movement of these areas of the belt through the developer units 40, 42, 44 and 46. An infrared densitometer (IRD) or toner area coverage (TAC) sensor 200 is utilized to sense or measure the reflection densities of images on the photoconductive belt 20 after they have been developed. A densitometer for black and white images or a colorimeter or spectrophotometer 300 for color images is disposed either before or after the fuser roll 74 or in the transfer loop and detects the appropriate color measurements.

The image bitmap contains information on the placement, area coverage and/or density, and the area over which the image remains constant for each separation. A comparison of this information within the image processor, IPS 12, with the defined sample requirements such as the minimum area required for sensing, the desired or minimum number of samples, and/or the sensor placement can lead to a calculation of a variable timing diagram directing each sensor when it should sample. The process controller 11 resides in the printer 18 and it calculates the timing diagrams for the sensors, processes the data from the sensors, compares those data to a corresponding, predetermined model characteristic such as a conventional tone reproduction curve or photo-induced discharge curve, and then makes adjustments to the process by means well known in the art.

The selection of which points on a photo-induced discharge curve or tone reproduction curve, for example, will be sampled need not be fixed if extrapolation or interpolation of the measurement is made against an algorithm representing the expected behavior or previously characterized behavior. For example, if the desired control points in area coverage space are 25%, 75% and 100%, and the image being printed in areas can offer area coverages suitable for sensing no closer to these than 20%, 68% and 100%, then comparison of these with an internal model of the tone reproduction curve can be used for control.

A particularly advantageous use of the virtual test pattern is with a densitometer or a colorimeter designed to look at the image after it has been transferred to paper, since it is desirable not to print a more conventional control patch on the user's output, and since alternative schemes either ignore transfer and fusing or involve the creation of special test copies. The present scheme has the flexibility of using the same "patches" as input to sensors both before and after the transfer step or to be used in conjunction with more conventional control patches, typically in non-image areas, where more frequent or predictable sampling is required. For example, an operator may use a patch generator in the interdocument area for reading with an ESV and periodically update the control target for the ESV with a reading at some other sampling frequency from a densitometer looking at a virtual patch on the output copy. A TAC sensor monitoring developed mass on the photoconductive belt could be directed to read either or both of these.

In cases where an image presents no suitable sampling areas, controller 11 can be directed to revert to a default condition, or to continue in the condition arrived at from a previous sample. This would be analogous to present systems that either sample outputs sporadically or not at all. The default condition can be a function of preset conditions, the last valid condition or any desired configuration (see FIG. 2B).

Sensors 100, 200 and 300 can be fixed in position or movable, depending on the sampling frequency desired, cost requirements, nature of the job image being run, and the image quality goals. The decision of whether or not to move the sensors can be made for a machine design, job-to-job, or within a job or image frame. In this instance, movable sensors 100, 200 and 300 are supported for movement along the Z-axis (perpendicular to the page in FIG. 1). The location to be sensed in the X-axis direction is determined by the variable timing diagram discussed above as the sheet is conveyed through the apparatus. Motors 15 for positioning the sensors (shown in phantom in FIG. 1) are controlled by controller 11 in accordance with the location on the sheet to be sensed.

The criteria for the selection of areas of the image to be sensed can be defined by a number of parameters. A first parameter is the required minimum area for a reliable sensor reading. A greater area of the image for sensing will provide a more accurate reading. In addition, certain types of sensors will require larger areas for sensing. Still further, sensing areas can be maximized with the use of movable sensors as discussed above. A second parameter is the number of readings desired per sample. Similar to a large area for sensing, a greater number of readings will provide more accurate results. This can similarly be facilitated by providing movable sensors. A third parameter includes the image type and content required for desired control of output images. For example, one might choose to select areas representing background (non-image), a solid area (maximum output density), and/or a three color, quarter tone (for control of critical color balance). A fourth parameter is the position of the area to be sensed. This parameter is particularly important for calculating the timing diagram for movable sensors in that not only must the position of the patch be known, but also the ability of the sensor to reach that position in time to make a valid reading. A fifth parameter is the maximum sampling rate of the sensors to enable selection of patches that allow sufficient time between samples for sensor recovery, data processing, and other time-consuming actions. A sixth parameter is the interpolation and/or extrapolation capability as discussed above. Each of the parameters for the selection of areas of the image to be sensed are a function of cost requirements and image quality goals.

Since the sampled area will move over time, it may be necessary to correct the reading according to a positional map that represents the deterministic portion of the within frame variation arising from such causes as photoreceptor thickness variation, corotron skew, optics non-uniformities, and others well known in the art. This positional correction then allows for comparison of samples taken from different parts of the image and separation of temporal and positional effects. Such a map can be derived and updated periodically as part of the set-up procedures using the in-situ sensors and uniform input bitmaps. The map of outputs is processed and stored as a three dimensional matrix to be applied as a correction filter to future readings.

Figure 2A:
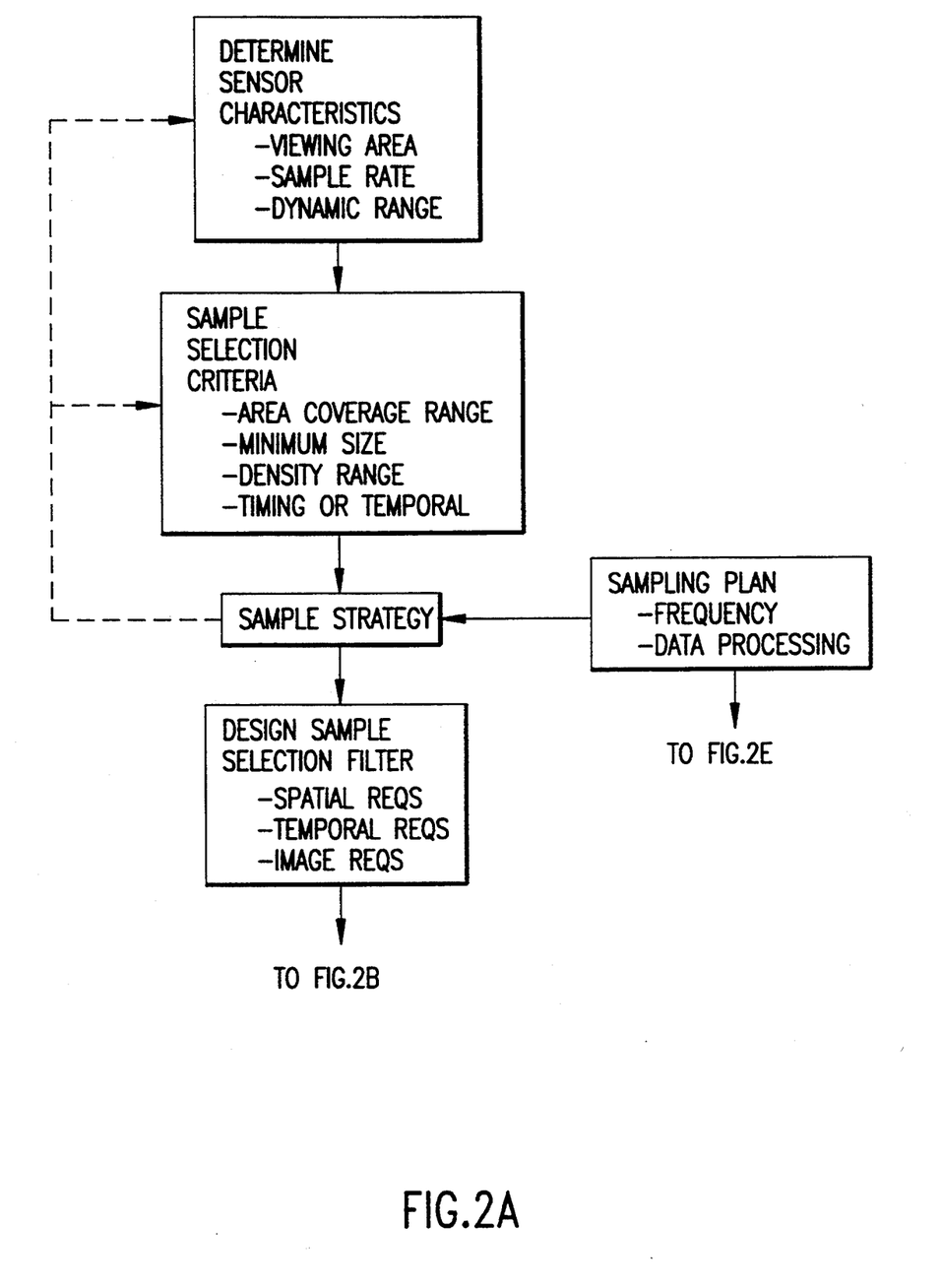
FIG. 2A is a flowchart showing the design of a sample selection filter incorporating a system sample strategy and a sampling plan.

Referring to FIG. 2A, design and/or selection of the sensor characteristics places important restrictions on the definition of acceptable sample areas; characteristics such as viewing area, maximum sampling rate, dynamic range, signal processing times, rest/response times, system registration, and others well known in the art impose limitations on sample selection in terms of minimum sample area, time (or distance) between samples, image type (solids, lines, halftones, density range), etc. The designer is then able to couple these requirements with the demands of the process control strategy for the machine to select the appropriate sensors, sampling plan, and to design an image selection software filter suitable for screening the bitmap for appropriate sample areas. This filter will define the spatial (location and size), temporal (frequency, relative location, and size), and image (type, uniformity, area coverage, density, color) requirements necessary.

Figure 2B:
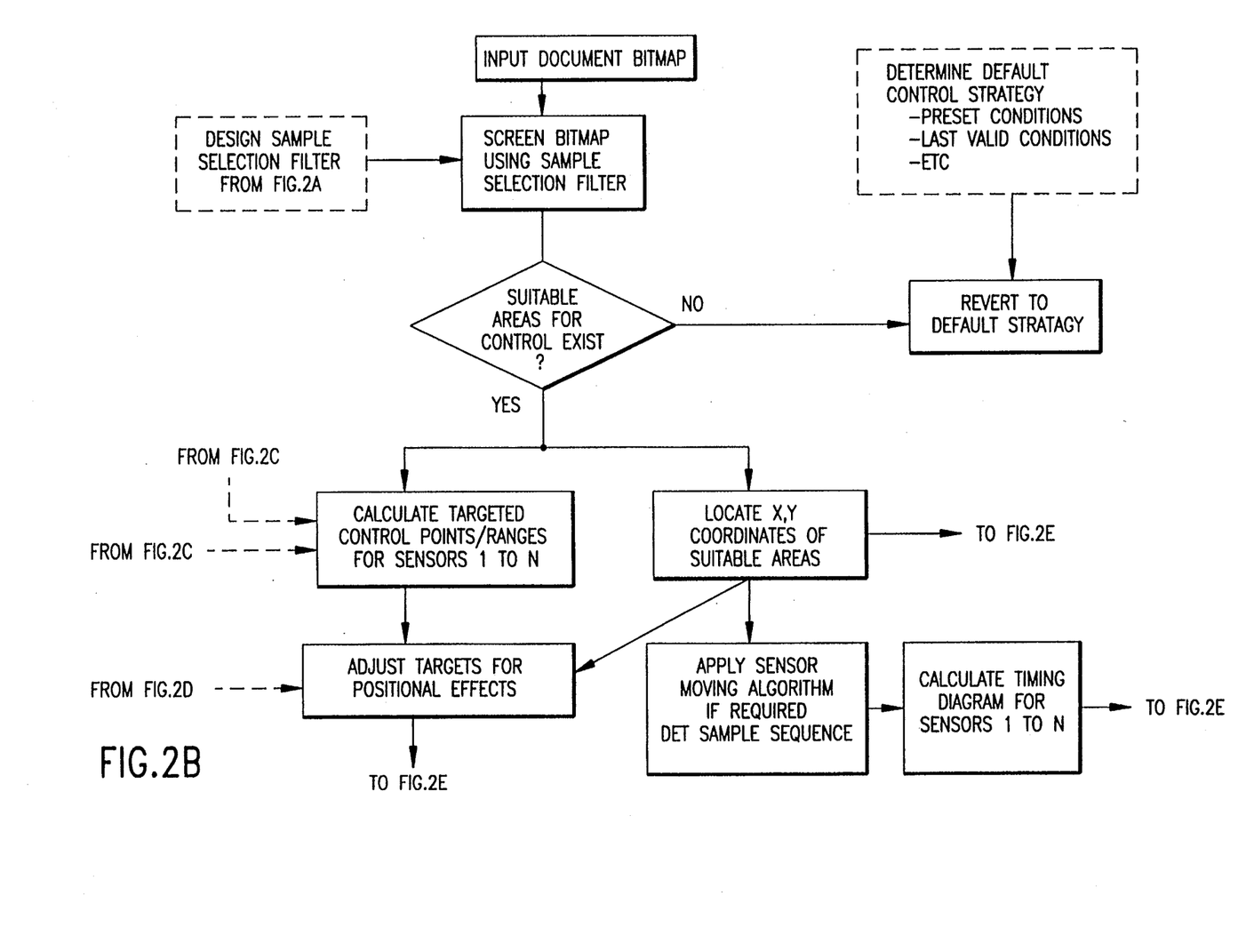
FIG. 2B is a flowchart showing a preprinting operation.

In a preprinting stage, illustrated in FIG. 2B, the design sample selection filter is applied to the document bitmap to screen the bitmap for suitable areas for sensing. If no suitable areas for sensing exist, the system will revert to the default strategy discussed above. If the system determines that there are suitable areas for sensing, the system calculates target control points/ranges for the sensors and locates the x-y coordinates of the suitable areas. The targets are then adjusted for positional effects as described above.

With continued reference to FIG. 2B, as noted above, if the sensors are movable, more image area will be available from which to select suitable sample areas. With an understanding of the design limitations for moving the sensors, such as time required to move, damp vibrations, etc., sample sequence is determined and the timing diagram discussed above is calculated for each of the sensors.

Figure 2C:
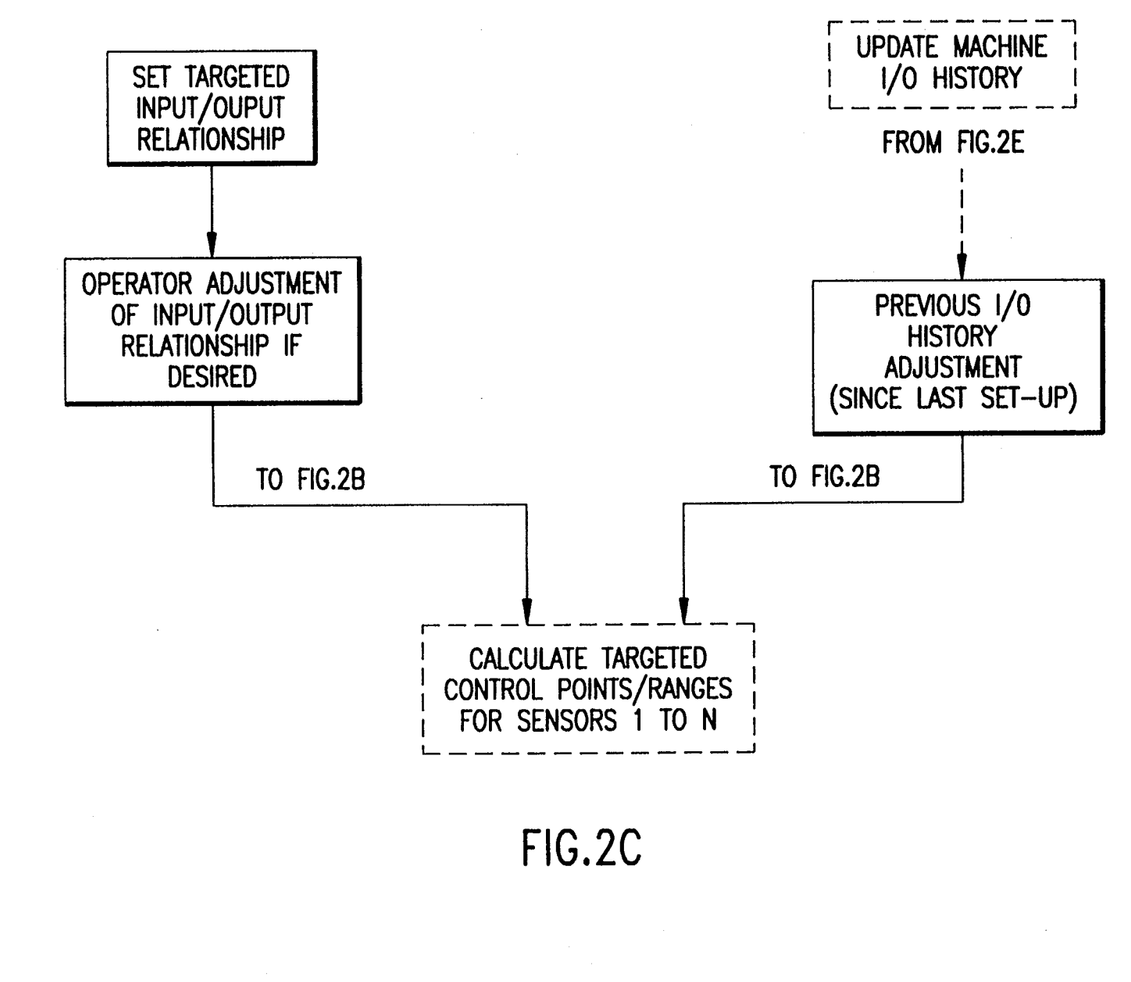
FIG. 2C is a flowchart showing the calculation of the target control points and/or ranges for the sensors.
Figure 2D:
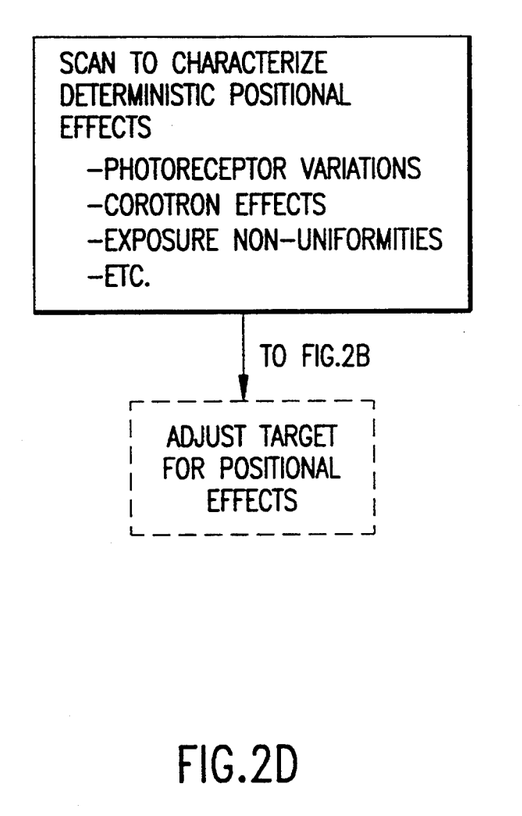
FIG. 2D is a flowchart illustrating the adjustment of the target for positional effects.

Referring to FIG. 2C, the target control points/ranges for the sensors are calculated using a target input/output relationship, adjusted by the operator if necessary and the machine input/output history. This history is an in-machine compilation of the chronological relationship between the input sample characteristics and output measurements for those same areas by the various control sensors as well as the control settings under which these occurred. This data base allows continual updating of the machine responses to changes in the control parameters and adjustment algorithms. FIG. 2D describes an additional refinement, performed periodically or during machine maintenance, that involves inputting a uniform bitmap from which a desired output can be described, using the in-situ sensors to measure the actual output over multiple cycles, processing this data to derive an average or deterministic output pattern, and comparison of this pattern with the desired output. Deterministic positional effects such as photoreceptor variations, corotron skew, exposure non-uniformity, or any other cause for which the system is not designed to correct, can be factored into the calculation of the target control points.

Figure 2E:
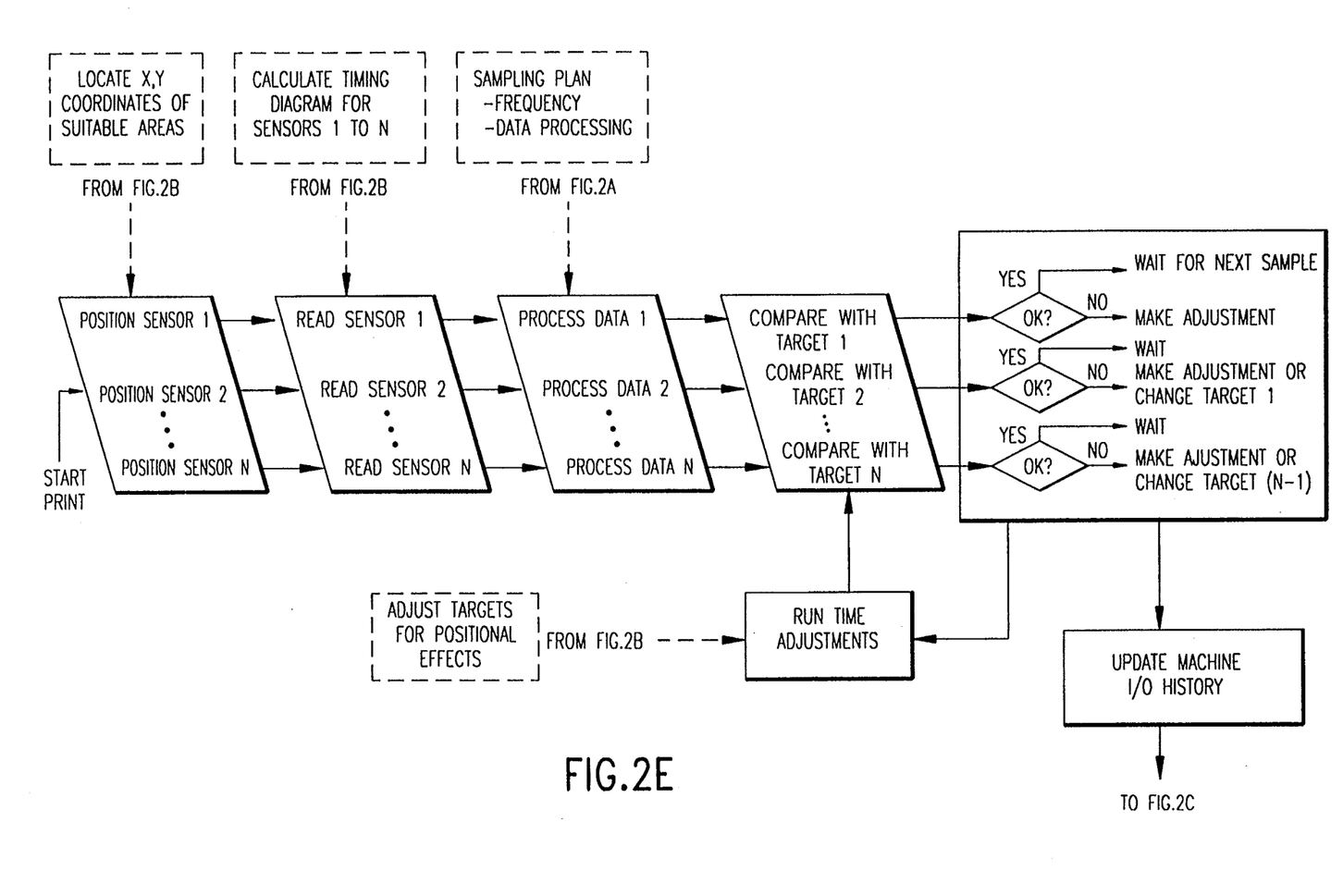
FIG. 2E is a flowchart showing the printing operation incorporating the present invention.

FIG. 2E is a flowchart showing the print cycle of an electronic printer in accordance with the invention. The determination of the location of the x-y coordinates of the suitable areas are applied to position the sensors for sampling. The timing diagram is applied to the actual sensor reading as determined by the image bitmap. After the sensors read their corresponding characteristics, the data is processed in accordance with the sampling plan, as discussed above in connection with FIG. 2A. These data are compared with corresponding target values, and it is determined whether an adjustment is necessary, whether to wait for the next sample or whether the target values should be changed. In a typical hierarchical control system, the adjustment can be either to the control parameter, which influences the characteristic being measured by Sensor (N), or applied as an adjustment to the target for a prior sensor/control loop (N-1) in the process in keeping with well known art. After any necessary adjustments, the system updates the machine input/output history and determines whether any run time adjustments are necessary until sufficient time has elapsed for a prior correction to the process parameters to take effect in accordance with the requirements imposed by the control system time constants. The target values are then adjusted in accordance with these determinations, and the process is started again with reference to the sample strategy.

While the embodiments disclosed herein are preferred, it will be appreciated from this teaching that various alternatives, modifications, variations or improvements therein may be made by those skilled in the art that are within the scope of the invention, which is defined by the following claims.

What is claimed is:

1. A method of testing subsystem performance of an electronic printer using an electronic scanning system (ESS) bitmap representing an image to be printed, the method comprising the steps of:

determining a location in said bitmap of at least one point in said image for sensing by determining a sample selection filter in accordance with a sampling strategy, said sampling strategy being determined based on predetermined criteria;

sensing a characteristic of said at least one point in said image, said characteristic based on a type of sensing apparatus;

comparing said characteristic with a target characteristic; and adjusting said characteristic to correspond with said target characteristic in accordance with said comparing step.

2. A method as claimed in claim 1, wherein said step of determining said sampling strategy comprises the steps of determining sample selection criteria in accordance with said predetermined criteria and providing a sampling plan describing at least one of sample frequency, signal processing and data reduction, and limit criteria.

3. A method as claimed in claim 1, further comprising, prior to said location determining step, the step of screening said bitmap in accordance with said sample selection filter to determine whether suitable areas for sensing exist, and, wherein if no suitable areas for sensing exist, the step of reverting to a default strategy.

4. A method as claimed in claim 3, further comprising the steps of calculating said target characteristic and locating coordinates of said suitable areas in said bitmap.

5. A method as claimed in claim 4, wherein said target characteristic calculating step comprises the steps of setting a target input/output relationship and adjusting said relationship in accordance with a previous input/output history.

6. A method according to claim 4, further comprising the step of adjusting said target characteristics for positional effects.

7. A method according to claim 6, further comprising the step of further adjusting said target characteristics during run time in accordance with control system time constants.

8. A method as claimed in claim 4, further comprising the step of calculating a timing diagram for said sensing apparatus to perform said sensing step in accordance with said locating step.

9. A method as claimed in claim 8, wherein said sensing apparatus is movable, the method further comprising the step of moving said sensing apparatus and making attendant adjustments to said timing diagram.

10. An apparatus for testing subsystem performance of an electronic printer using an electronic scanning system (ESS) bitmap representing an image to be printed, comprising:
   means for determining a location in said bitmap of at least one point in said image for sensing, said determining means comprising means for determining a sample selection filter in accordance with a sampling strategy, wherein said sampling strategy is determined based on predetermined criteria;
   means for sensing a characteristic of said at least one point in said image, said characteristic being based on a type of sensing apparatus;
   means for comparing said characteristic with a target characteristic; and
   means for adjusting said characteristic to correspond with said target characteristic in accordance with said comparing means.

11. An apparatus as claimed in claim 10, wherein said means for determining said sampling strategy comprises means for determining sample selection criteria in accordance with said predetermined criteria and for providing a sampling plan describing at least one of sample frequency, signal processing and data reduction, and limit criteria.

12. An apparatus as claimed in claim 10, further comprising means for screening said bitmap prior to determining said location in accordance with said sample selection filter to determine whether suitable areas for sensing exist, and means for reverting to a default strategy if no suitable areas for sensing exist.

13. An apparatus as claimed in claim 12, further comprising means for calculating said target characteristic and for locating coordinates of said suitable areas in said bitmap.

14. An apparatus as claimed in claim 13, wherein said target characteristic calculating means comprises means for setting a target input/output relationship and for adjusting said relationship in accordance with a previous input/output history.

15. An apparatus according to claim 13, further comprising means for adjusting said target characteristics for positional effects.

16. An apparatus according to claim 15, further comprising means for further adjusting said target characteristics during run time in accordance with control system time constants.

17. An apparatus as claimed in claim 13, further comprising means for calculating a timing diagram for said sensing apparatus to perform said sensing means in accordance with said locating step.

18. An apparatus as claimed in claim 17, wherein said sensing apparatus is movable, the apparatus further comprising means for moving said sensing apparatus and for making attendant adjustments to said timing diagram.

19. An apparatus according to claim 10, wherein said sensing means comprises an electrostatic voltmeter (ESV).

20. An apparatus according to claim 10, wherein said sensing means comprises an infra-red densitometer (IRD).

21. An apparatus according to claim 10, wherein said sensing means comprises a densitometer.

22. An apparatus according to claim 10, wherein said sensing means comprises a colorimeter.

23. An apparatus according to claim 10, wherein said sensing means comprises a toner area coverage (TAC) sensor.

24. An apparatus according to claim 10, wherein said sensing means comprises a spectrophotometer.

* * * * *